(12) United States Patent
Braga

(10) Patent No.: US 6,265,455 B1
(45) Date of Patent: Jul. 24, 2001

(54) FOAMED CRYSTALLINE IONOMER POLYOLEFINS

(75) Inventor: Vittorio Braga, Ferrara (IT)

(73) Assignee: Montell North America Inc., Wilmington, DE (US)

( * ) Notice: Subject to any disclaimer, the term of this patent is extended or adjusted under 35 U.S.C. 154(b) by 0 days.

(21) Appl. No.: 09/402,380

(22) PCT Filed: Feb. 3, 1999

(86) PCT No.: PCT/EP99/00711

§ 371 Date: Oct. 4, 1999

§ 102(e) Date: Oct. 4, 1999

(87) PCT Pub. No.: WO99/41303

PCT Pub. Date: Aug. 19, 1999

(30) Foreign Application Priority Data

Feb. 10, 1998 (IT) .............................. MI98A0244

(51) Int. Cl.$^7$ ........................................ C08J 9/00
(52) U.S. Cl. .............................. 521/92; 521/143
(58) Field of Search ........................ 521/92, 143

(56) References Cited

U.S. PATENT DOCUMENTS 4,364,565 * 12/1982 Tomar ........................ 273/60 R
5,026,067 * 6/1991 Gentiluomo .................. 273/220
5,981,658 * 11/1999 Rajagopalan et al. ............. 525/72

FOREIGN PATENT DOCUMENTS

| 0 058 762 A1 | 9/1982 | (EP) . |
| 0 370 736 A2 | 5/1990 | (EP) . |
| 0 450 342 A2 | 10/1991 | (EP) . |

OTHER PUBLICATIONS

Patent Abstracts of Japan, vol. 006, No. 249 (M–177), Dec. 8, 1982 & JP 57 144731 A, Sep. 7, 1982.

Database WPI, Derwent Publications, Ltd., London, GB, AN 83–7141173 XP002102647 and JP 58 098243 A (Tokuyama), Jun. 11, 1983.

* cited by examiner

*Primary Examiner*—Rachel Gorr
*Assistant Examiner*—Melanie Bagwell

(57) ABSTRACT

A foamed ionomer polymer comprising metal ions pertaining to the IA, IIA, or IIB Group of the Periodic Table, and a crystalline or semicrystalline graft copolymer where the backbone polymer chain of the graft copolymer is a polymer of an olefin selected from ethylene and $C_3$–$C_{10}$ α-olefins, and the grafted chains comprise monomers containing at least one functional group selected from carboxylic groups and their derivatives.

9 Claims, No Drawings

FOAMED CRYSTALLINE IONOMER POLYOLEFINS

This invention concerns foamed ionomer graft copolymers. In particular, it concerns foamed thermoplastic olefin polymers. Moreover, this invention concerns articles manufactured from the above mentioned foamed polymers, and the process for the preparation of said polymers and articles. The embodiments of the present invention, i.e., the foamed ionomer polyolefins and the articles obtainable from them, have a variety of applications; thanks to the rigidity of said foamed polymers they are used to produce, for example, automotive parts and insulating structures for refrigerators.

Foamed polymers produced from cross-linked crystalline thermoplastic polyolefins are already known, however, said olefin polymers are not ionomeric. Examples of said foamed polymers are described in European patent application EP-A-450342 filed on behalf of Ausimont. Said patent application describes a foamed isotactic polypropylene cross-linked with peroxides and furfuraldiazine derivatives as the cross-linking coagents.

Crystalline or semicrystalline ionomer polyolefins and the process to produce them are already known; they are described, for example, in European patent application EP-A-370 736 filed on behalf of Du Pont.

Now unexpectedly it has been found that said ionomer polyolefins can also be used to produce foamed polymers.

Therefore, object of the present invention is a foamed ionomer polymer comprising metal ions pertaining to the IA, IIA or IIB Group of the Periodic Table, and a crystalline or semicrystalline graft copolymer where the backbone polymer chain of the graft copolymer is a polymer of an olefin selected from ethylene and $C_3$–$C_{10}$ α-olefins, and the grafted chains comprise monomers containing at least one functional group selected from carboxylic groups and their derivatives. In addition to ionic bonds, one can also find in said polymer interactions between the functional groups present in the grafted chains and the metal.

For the purpose of the present invention the terms crystalline and semicrystalline refer to those polymers that are less than 40% soluble in xylene at ambient temperature (i.e., about 25° C.).

The olefin polymers used to produce the graft copolymers of the present invention are preferably selected from homopolymers and random copolymers. The homopolymers and copolymers can be used alone or mixed together.

The olefin polymers for the production of the graft copolymers used in the present invention are preferably selected from a propylene homopolymer, and copolymer of propylene with ethylene or $C_4$–$C_{10}$ α-olefins, or mixtures thereof. The preferred comonomers are: ethylene, 1-butene, 4-methyl-1-pentene, 1-hexene, and 1-octene.

The quantity of comonomers in the above mentioned copolymers is less than 20% by weight with respect to the weight of the copolymer.

As mentioned above, the foamed polymers of the present invention are graft copolymers. The preparation takes place by grafting unsaturated monomers on the above mentioned olefin polymers, said monomers containing at least one functional group selected from the carboxylic groups and their derivatives, such as esters and anhydrides. Said monomers can contain one or more, such as two for example, carboxylic groups or their derivatives. Examples of the above mentioned monomers with functional groups are the vinyl monomer acids, among which the acrylic and methacrylic acids are the preferred ones. Other examples are the methacrylic, itaconic and citraconic, maleic, and fumaric acids, and the corresponding anhydrides and esters.

In the mixture of the present invention the above mentioned functionalized monomers are present preferably in a quantity ranging from 0.1 to 25%, more preferably from 0.6 to 10% by weight with respect to the weight of the polymer mass.

The metal present in the foamed polymer of this invention is a metal pertaining to the IA, IIA or IIB Group of the Periodic Table. Examples of said metals are sodium, lithium, potassium, zinc, magnesium, and calcium; the last three listed are the preferred ones.

The quantity of metal ions depend on the desired degree of cross-linking, and the quantity of functional groups grafted on the polymer. The polymer to be foamed is partially cross-linked. The definition of "partially cross-linked" refers to the degree of cross-linking, i.e., when the gel content with respect to the weight of the polymer soluble in hot xylene (135° C.) after cross-linking is preferably less than 20%, more preferably less than 15%. The gel corresponds to the fraction of polymer that is insoluble due to cross-linking.

In addition to the above mentioned components the foamed polymer of this invention can contain other ingredients that are generally added to thermoplastic polymers. Said additives are, for example, reinforcing fillers (such as silica, talc, cellulose, and carbon black), pigments and dies, antioxidants, thermal and optical stabilizers, and antistatic agents.

The graft copolymers used in this invention can be prepared according to known methods.

As a way of example, one can mix together the olefin polymer, the functionalized unsaturated monomers, and optional additives under conditions that cause the grafting of said monomers on the polymers.

The above mentioned grafting reaction is carried out by using known techniques. For example, one method consists of grafting the above mentioned functionalized monomers on the polymers in the presence of radical initiators. By properly selecting the quantity of the above mentioned monomers with functionalized groups that are added to the polymer to be modified, one obtains a polymer modified with functionalized monomers having the composition previously described. Said modification occurs by using the proper quantity of free radical initiators (for example peroxides such as the dicumyl peroxide, and the 2,5-dimethyl-2,5-di(tert-butylperoxy)hexane), operating preferably in inert atmosphere, such as nitrogen for example. For said process one can use the same mixing and extrusion equipment described below.

An alternative method for the preparation of the graft copolymer consists of preparing in advance a concentrate comprising a polymer matrix, monomers with a functional group, and free radical initiators. Subsequently, said concentrate is mixed with the olefin polymer, and other additives if used, operating under conditions that will cause the grafting reaction to occur.

The above mentioned polymer matrix of the concentrate can have, for example, the same composition of the olefin polymer to be grafted, or it can be an other olefin polymer. As an alternative one can use a polymer different from the ones mentioned, but compatible with them.

The above mentioned mixing operations are carried out in apparatus commonly used for such purpose. For example said mixing can be done using internal mixers (such as a Banbury for example), or single screw extruders (such as a Buss for example), or twin-screw extruders equipped with mixing components (such as a Werner for example).

The mixing temperature generally ranges from 170° to 250° C.

The ionomer polymers used in this invention are known, and known methods are used for their preparation.

As a way of example, one of the preparation methods consists of mixing the graft copolymer previously obtained to a metal compound, such as, for example, an oxide, an hydroxide, or a salt, such as carbonate, or mixtures of said compounds. The mixing can occur under the same operating conditions and with the same equipment used for the preparation of the grafted polymer.

As an alternative, the ionomer polymer can be prepared by contacting the graft copolymer with an aqueous solution, or a fine dispersion in water of an alkaline compound of the above mentioned metals. The alkaline compound is preferably a hydroxide, a carbonate, or a bicarbonate of the aforesaid metals. Said method is described, for example, in the above mentioned patent application EP-A-370736.

The cross-linked polymers thus obtained are subsequently foamed in order to obtain the foamed polymers and articles of the present invention, which preferably have a density ranging from 0.1 to 0.6 g/cm$^3$, more typically from 0.2 to 0.5 g/cm$^3$. In order to obtain the foamed polymer one can use processes and foaming agents commonly known in the art.

The foaming agents that can be used are both of the chemical and physical type. In the case of the former, the decomposition temperature typically ranges from 100° to 220° C. The chemical foaming agents conveniently used develop gas by thermal decomposition, or by way of chemical reactions. Examples of said foaming agents are: azodicarbonamides, sulfonyl-hydrazides, dinitropentamethylenetetramine, p-toluenesulfonyl-semicarbazide, trihydrazine-triazine, barium azodicorboxylate, sodium borohydrate, phenyl sulfone, gypsum and aluminum hydrates, sodium bicarbonate, and citric acid, or carboxylic salts, and generally speaking all the products used in the art for this purpose whose decomposition temperature is at least equal to the softening temperature of the cross-linked polymer.

All the physical foaming agents known can be used, for example: light aliphatic hydrocarbons, optionally fluorinated and/or chlorinated, having a boiling point greater than 25° C., such as pentane, hexane, dichlorotrifluorethanes, methylene chloride; or gaseous or liquid compounds having a boiling point lower than 25° C., such as air, nitrogen, carbon dioxide, chlorofluoromethane, dichlorofluoromethane, propane, butane, and isobutane.

In the processes for the preparation of the foamed polymers one can use the extruders commonly used in the art, such as the single screw and twin-screw extruders cited above.

The physical foaming agents are preferably injected or introduced in the melted polymer mass in the extruder at a distance, from the point where the solid polymer is fed, where the polymer is found melted and homogeneous.

The chemical foaming agents can be mechanically blended with the solid polymer prior to the extrusion phase. The dry blend thus obtained is then introduced in the first feeding area of the extruder, which is maintained at a temperature ranging from 130° and 200° C. At the output of the extruder, equipped with the appropriate die, such as a flat die or one designed for tubing, the temperature is maintained at a temperature which is most suited to obtain the foaming of the polymer. Said temperature preferably ranges from 125° to 200° C.

The foamed polymers of this invention can be produced, for example, by way of a process that consists of cross-linking a polymer in an extruder as described above. Subsequently the pellets of the cross-linked polymer are fed into an extruder of the type previously described. At a given distance from the extruder's feeding point a foaming agent is introduced into the melted mass, allowing the entire mass to proceed along the extruder, so that the foaming occurs at the output of the extruder. The temperature in this case is also generally maintained between 125° and 200° C.

According to an other method, the foamed polymers can be prepared during the preparation of the cross-linked polymers; for example, in an extruder of the type mentioned above one feeds a mixture comprising polymer, peroxide, and monomer with polar groups. At a given distance from the extruder's feeding point, for example at ⅔ of the length of the extruder, one introduces in the molten mixture both the metal and the foaming agent, allowing the entire mixture to proceed along the extruder thus causing cross-linking, and the foaming occurs at the extruder's output. In this case the extruder's temperature generally ranges from 170° and 220° C.

The following examples are given in order to illustrate and not limit this invention.

Some tests have been carried out on the polymer of the present invention in order to evaluate characteristics and properties; the methodology used to conduct said tests is described below.

Solubility: determined as the percentage of the residue soluble in xylene at 25° C. in the following manner: a solution is prepared of the sample in xylene at a concentration of 1% by weight, while the sample is maintained under agitation in xylene for one hour at 135° C. Continuing to stir, the content is allowed to cool to 95° C., after which the solution is poured into a 25° C. bath, where it is allowed to rest for 20 minutes without stirring, and then the stirring is resumed for an additional 10 more minutes. The solution is then filtered, and acetone is added to a portion of the filtrate in order to obtain the precipitation of the dissolved polymer. The polymer thus obtained is then recovered, washed, dried, and ultimately weighed in order to determine the percentage soluble in xylene.

Insolubility: determined as the percentage of the residue insoluble in xylene at 130° C. A known quantity of the cross-linked polymer is put in xylene and heated to 130° C. as described in the solubility test. The xylene solution is then filtered at 130° C. The portion that remains in the filter is the residue insoluble in xylene at 130° C.

Melt Flow rate (MFR): according to ASTM-D 1238, condition L.

Flexural Modulus (FM): according to ASTM-D 790.

Melt Tension: the melt strength at break is determined by using a Melt Tension Tester manufactured by Toyo-Seuki Seisakisho Ltd.

The method consists of determining the tension experienced by a strand of melted polymer during the stretching of the extruded mass. In particular, the polymer to be examined is extruded at 200° C. in conformance with ASTM-D 1238. The extruding strand is then subjected to stretching by way of a tension pulley which is under constant acceleration. The increase in the revolutions of the pulley is fixed at 8 rpm/s. The tension of the strand is measured until the latter breaks. The tensile strength of the strand, and the draw ratio values are thus determined. The tensile strength corresponds to the melt strength.

a) Polymer Cross-linking

EXAMPLES 1–4

Cross-linked polymers are prepared using the following formulation:
(a) 90% by weight of a propylene polymer,
(b) 5% by weight of a concentrate comprising 5% by weight of maleic anhydride, 1% by weight of 2,5-dimethyl-2,5-di(tert-butylperoxy)hexane, and 94% by weight of a polyolefin matrix containing 32% by weight of $C_2$–$C_3$ elastomeric polymer, and
(c) 5% by weight of a ZnO concentrate (80% ZnO and 20% ethylene-propylene rubber), with the trademark Rhenogran®.

The preparation is carried out by mixing components (a) and (b) in an internal twin-screw Banbury mixer, at 60 rpm, and at a temperature of 190–200° C. Component (c) is added after 2 minutes. The mixing continues for an additional 2–3 minutes. On the polymer thus obtained are then determined the values, shown in Table 1, regarding the MFR, insolubility in xylene at 130° C., melt strength at break, and draw ratio at break. The portion that is definitely insoluble in xylene at 130° C. in the cross-linked polymer of example 4 is equal to 6.5% by weight, said fraction due to the contributions of components (b) and (c), which are respectively 1.5%, which corresponds to the elastomeric portion in the copolymer base of the maleic anhydride concentrate, and 5%, which corresponds to the ZnO concentrate. To said percentage one adds the copolymer fraction containing the cross-linked ethylene of component (a), which is equal to 10.8% by weight(supposing that the entire fraction is cross-linked); said fraction is insoluble in xylene at 130° C. The sum total of said fractions is 17.3% by weight. By subtracting from the weight percentage of the portion insoluble in xylene at 130° C. (see Table 1) the percentage calculated above corresponding to the fractions definitely insoluble in xylene at 130° C., there is a difference of 3% by weight which is attributable to the homopolypropylene fraction of component (a) that is rendered insoluble following the cross-linking of the homopolymer.

EXAMPLE 5

Example 1 is repeated with the difference that the formulation used is as follows:
(a) 85% by weight of polymer, (b) 10% by weight of the concentrate with maleic anhydride, and (c) 5% by weight of the concentrate with ZnO.

On the cross-linked polymer thus obtained are then determined the values, shown in Table 1, regarding the MFR, insolubility in xylene at 130° C., melt strength at break, and draw ratio at break.

The portion that is definitely insoluble in xylene at 130° C. is equal to 8% by weight, and is due to the contributions of components (b) and (c), which are respectively 3%, which corresponds to the elastomeric portion in the copolymer base of the maleic anhydride concentrate, and 5%, which corresponds to the ZnO concentrate.

By subtracting from the weight percentage of the portion insoluble in xylene at 130° C. (see Table 1) the percentage calculated above corresponding to the fractions definitely insoluble in xylene at 130° C., there is a difference of 1.1% by weight which is attributable to the homopolypropylene fraction of component (a) which is rendered insoluble following the cross-linking of the propylene homopolymer.

Table 1 shows the comparison of the values concerning insolubility at 130° C., melt strength at break, and draw ratio at break of the cross-linked polymers in the molten state at equal MFR, with the values of the not cross-linked polymers in the molten state (comparative examples 1c–5c). The increase in the melt strength values, and the decrease in the draw ratio at break values associated with the increase in the quantity insoluble in xylene, show that a partial cross-linking of the products occurred.

TABLE 1

| Example | Polymer | MFR dg/min | Insolubility at 130° C. | Melt strength at break g | Draw ratio at break % |
| --- | --- | --- | --- | --- | --- |
| 1 | Heterophasic copolymer[1] | 3.5 | — | 1.44 | 733 |
| 1c | Heterophasic copolymer[2] | 3.5 | 0 | 1.2 | 2000 |
| 2 | Random copolymer[3] | 7.7 | — | 0.86 | 1019 |
| 2c | Random copolymer[4] | 8.0 | 0 | 0.70 | 4050 |
| 3 | Propylene homopolymer[5] | 28.4 | — | 0.87 | 2305 |
| 3c | Propylene homopolymer[6] | 25.0 | 0 | 0.25 | 2900 |
| 4 | Heterophasic copolymer[7] | 5.4 | 21.3 | 1.03 | 447 |
| 4c | Heterophasic copolymer[1] | 7.0 | 0 | 0.70 | 2000 |
| 5 | Propylene homopolymer[8] | 17.9 | 9.1 | 0.65 | 283 |
| 5c | Propylene homopolymer[9] | 16.0 | 0 | 0.30 | 2700 |

[1]Isotactic propylene copolymer with 7.5% of ethylene by weight, solubility 12% by weight, MFR 7 dg/min, and FM 1350 MPa.
[2]Isotactic propylene copolymer with 8.5% of ethylene by weight, solubility 13% by weight, MFR 3.5 dg/min, and FM 1250 MPa.
[3]Propylene random copolymer with 3% of ethylene by weight, solubility 6% by weight, MFR 1.8 dg/min, and FM 800 MPa.
[4]Propylene random copolymer with 3% of ethylene by weight, solubility 6% by weight, MFR 8 dg/min, and FM 1000 MPa.
[5]Isotactic propylene homopolymer with a solubility of 5% by weight, MFR of 6 dg/min, and FM of 1550 MPa.
[6]Isotactic propylene homopolymer with a solubility of 4% by weight, MFR of 25 dg/min, and FM of 1700 MPa.
[7]Heterophasic propylene copolymer (containing 8.5% by weight of ethylene, and 12% by weight of a soluble fraction capable of being cross-linked), having MFR of 0.8 dg/min, and FM of 1200 MPa.
[8]Isotactic propylene homopolymer (containing 5% by weight of a soluble fraction not capable of being cross-linked), having MFR of 0.7 dg/min, and FM of 1450 MPa.
[9]Isotactic propylene homopolymer with a solubility of 4% by weight, MFR of 16 dg/min, and FM of 1650 MPa.

b) Foaming Tests

Example I

The cross-linked polymer of example 3 is foamed in the presence of Na bicarbonate in the quantity of 3% by weight, using the following methods:

$1^{st}$ method: the polymer pellets are extruded in an extruder at 170° C. (L/D=40, diameter=40 mm). The resulting foamed strand has a density of 0.45 g/cm$^3$.

$2^{nd}$ method: the polymer pellets and the Na carbonate are dry blended in a mixer at ambient temperature. The blend is then introduced in a Battenfeld BA/125 CD injection press with a 25 mm diameter and at a temperature of 180° C., where said press injects the foamed material into a spherical mold with a 60 mm diameter at a temperature of 60° C. The cooling time is 60 seconds. The resulting foamed polymer has a spherical form and a density of 0.25 g/cm$^3$.

Example II

Example I is repeated with the difference that the cross-linked polymer of example 3 is foamed in the presence of carboxylic salt (Hydrocerol BHI) in the quantity of 2% by weight with respect to the polymer to be foamed.

$1^{st}$ method: the resulting foamed strand has a density of 0.5 g/cm$^3$.

$2^{nd}$ method: the resulting foamed polymer has a spherical form and a density of 0.26 g/cm$^3$.

Example III

Example II is repeated with the difference that the foamed polymer is the cross-linked polymer of example 2.

$1^{st}$ method: the resulting foamed strand has a density of 0.5–0.55 g/cm$^3$.

$2^{nd}$ method: the resulting foamed polymer has a spherical form and a density of 0.285 g/cm$^3$.

Example IV

Example I is repeated with the difference that the polymer which is foamed is the cross-linked polymer of example 4 with 2.5% of sodium bicarbonate.

$1^{st}$ method: the resulting foamed strand has a density of 0.38 g/cm$^3$.

$2^{nd}$ method: the resulting foamed polymer has a spherical form and a density of 0.35 g/cm$^3$.

What is claimed is:

1. A foamed ionomer polymer comprising metal ions pertaining to the IA, IIA or IIB Group of the Periodic Table, and a crystalline or semicrystalline graft copolymer where the backbone polymer chain of the graft copolymer is a propylene homopolymer or a random copolymer of propylene with a comonomer selected from ethylene or $C_4$–$C_{10}$ α-olefins or mixtures thereof, the comonomer being in an amount of less than 20% by weight with respect to the weight of the copolymer, and the grafted chains comprise monomers containing at least one functional group selected from carboxylic groups and their derivatives.

2. The foamed ionomer polymer of claim 1, wherein the monomer containing at least one carboxylic functional group is maleic anhydride.

3. A foamed ionomer polymer obtained by way of a process comprising contacting a metal compound pertaining to the IA, IIA or IIB Group of the Periodic Table with a crystalline or semicrystalline graft copolymer wherein the backbone polymer chain is a propylene homopolymer or a random copolymer of propylene with a comonomer selected from ethylene or $C_4$–$C_{10}$ α-olefins or mixtures thereof, the comonomer being in an amount of less than 20% by weight with respect to the weight of the copolymer, and the grafted chains comprise monomers containing at least one functional group selected from the carboxylic groups and their derivatives.

4. The foamed ionomer polymer of claim 3, wherein the metal compound is selected from the oxides, hydroxides, salts, and mixtures thereof.

5. The foamed ionomer polymer of claim 3, wherein the monomer containing at least one carboxylic functional group is maleic anhydride.

6. The foamed ionomer polymer of claim 1 or 3 having a density ranging from 0.1 to 0.6 g/cm$^3$.

7. The foamed ionomer polymer of claim 6 having a density ranging from 0.2 to 0.5 g/cm$^3$.

8. An automotive part obtained from the foamed ionomer polymer of claim 1 or 3.

9. An insulating structure for refrigerators obtained from the foamed ionomer polymer of claim 1 or 3.

* * * * *